(12) United States Patent
Barrick et al.

(10) Patent No.: US 12,436,024 B1
(45) Date of Patent: Oct. 7, 2025

(54) COMPACT CONVERTIBLE UNIVERSAL SINGLE PASS/DOUBLE PASS OPTICAL SYSTEM

(71) Applicant: National Technology & Engineering Solutions of Sandia, LLC, Albuquerque, NM (US)

(72) Inventors: Todd Andrew Barrick, Bosque Farms, NM (US); Ryan J. Law, Albuquerque, NM (US); Bradley Salzbrenner, Albuquerque, NM (US); Jeffrey D. Hunker, Albuquerque, NM (US); Brian McFarland, Albuquerque, NM (US); Lambert Paul Parazzoli, Lavallette, NJ (US); Jonathan David Sterk, Albuquerque, NM (US); Daniel Lynn Stick, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 743 days.

(21) Appl. No.: 17/854,861

(22) Filed: Jun. 30, 2022

(51) Int. Cl.
*G01H 9/00* (2006.01)
*G02F 1/11* (2006.01)

(52) U.S. Cl.
CPC .............. *G01H 9/004* (2013.01); *G02F 1/113* (2013.01)

(58) Field of Classification Search
CPC ................................ G01H 9/004; G02F 1/113
See application file for complete search history.

(56) References Cited

U.S. PATENT DOCUMENTS

| | | | |
|---|---|---|---|
| 9,678,300 B2* | 6/2017 | Nguyen | G02B 7/003 |
| 10,211,590 B2* | 2/2019 | Filgas | H01S 3/094057 |
| 10,297,968 B2* | 5/2019 | Filgas | G02B 6/00 |

* cited by examiner

*Primary Examiner* — John Bedtelyon
(74) *Attorney, Agent, or Firm* — Mark A. Dodd

(57) ABSTRACT

A compact convertible single pass (SP)/double pass (DP) optical system is disclosed. The convertible optical system is convertible in the sense that the optical system can be configured to have any one of multiple configurations, including SP/DP, DP/SP, just SP, or just DP. This flexibility in the configuration is made possible by a compact baseplate with various predefined mounting points for the various optical elements required for the different configurations. Further, there is significant commonality among the optical elements required to implement the various configurations. For this reason, if one is cost constrained, one can start with the compact baseplate and populate it with the optical elements required for either the SP or DP configuration and later add the optical elements required to create the SP/DP or DP/SP configuration as funding permits.

20 Claims, 7 Drawing Sheets

105

COMPACT CONVERTIBLE UNIVERSAL SINGLE PASS/DOUBLE PASS OPTICAL SYSTEM

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a compact convertible optical system employing acousto-optic modulators to tune or frequency shift a laser signal that can readily be converted among single pass/double pass, double pass/single pass, single pass, and double pass configurations.

BACKGROUND

An optical system having a single pass/double pass (SP/DP) optical configuration allows for laser light at a single frequency to be significantly modulated in amplitude, phase, and frequency by using acousto-optic modulators (AOMs). These optical systems are typically large to allow for sufficient mode separation between frequencies generated by the AOM and are designed for a specific optical wavelength. For these reasons, such optical systems take up a large amount of real-estate on an optical table and introduce amplitude stability issues due to pointing instabilities in the optical beam. Additionally, the complexity of these optical systems requires precise alignment to ensure that the correct frequencies are generated, and the system is not optically lossy, meaning light is not lost in the optical train. These optical systems can also suffer lengthy down-times if an optical element must be replaced, causing a considerable time impact on experimentation.

Thus, the need exists for a compact convertible optical system with rapidly replaceable elements that produces large tuning and frequency shifts in laser light without suffering large optical losses.

SUMMARY

One aspect of the present invention relates to a compact convertible single pass (SP)/double pass (DP) optical system. The convertible optical system is convertible in the sense that one can configure a single optical system to have any one of multiple configurations, including SP/DP, DP/SP, just SP, or just DP. A compact baseplate, with various predefined mounting points for the various optical elements required for the different configurations, makes this flexibility in the configuration possible. Further, there is significant commonality among the optical elements required to implement the various configurations. For this reason, if one is cost constrained, one can start with the compact baseplate and populate it with the optical elements required for either the SP or DP configuration and later add the optical elements required to create the SP/DP or DP/SP configuration as funding permits.

Various embodiments of the convertible optical system provide one or more of the following benefits: (1) fast optical alignment and replacement of optical components, (2) compact size, (3) high optical efficiency and short beam paths, (4) configurability between SP/DP, DP/SP, just SP or just DP, (5) purge capability, (6) monolithic structure to reduce vibrational and thermal instabilities, (7) swept frequency, amplitude modulation, and multi-tone generation capable, (8) optical feedback to reduce noise, (9) ability to couple to polarization maintaining optical fibers, and (10) portability.

In at least one embodiment of the invention, a convertible optical system comprises a baseplate having a face, the baseplate includes one or more recesses and one or more pedestals (the one or more recesses and the one or more pedestals formed in the face of the baseplate, each of the one or more recesses and one or more pedestals locates one or more optical element stages), a first plurality of threaded holes (each of the first plurality of threaded holes receives a corresponding mounting bolt for a corresponding optical element stage), a plurality of guide pins (each of the guide pins laterally locates a corresponding optical element stage), and a second plurality of holes (each of the second plurality of holes receives a corresponding one of the plurality of guide pins), a corresponding elevation of each of the one or more recesses and each of the one or more pedestals places an optical axis of each optical element mounted to a corresponding optical element stage in a common plane, the common plane being parallel to the face of the baseplate, and the one or more recesses, the one or more pedestals, the first plurality of threaded holes, the plurality of guide pins, and the second plurality of holes permit the convertible optical system to form at least two of a single pass optical system, a double pass optical system, a single pass/double pass optical system, or a double pass/single pass optical signal.

In various embodiments, the baseplate includes one or more ports for receiving a purge gas; the baseplate includes a pair of handle recesses on opposite sides of a lower surface of the baseplate; the baseplate includes a plurality of labels to identify a location for a corresponding optical element; each major side of the baseplate has a maximum dimension of eighteen or fourteen inches; and the convertible optical system further comprises a plurality of cover mounts attached to the baseplate and a cover attaching to the baseplate via the plurality of cover mounts.

In other embodiments, the convertible optical system comprises a plurality of mirrors for reflecting light and a plurality of mirror stages having corresponding mirror stage bases (each of the mirrors attached to a corresponding mirror stage, each mirror stage including one or more adjusters for adjusting a position of a corresponding mirror, the adjuster(s) on a side of the mirror stage opposite the mirror stage base); the convertible optical system comprises at least one acousto-optic modulator (AOM) for altering a frequency and a direction of light based upon a corresponding received radio frequency drive signal and at least one AOM stage having corresponding AOM stage bases (each of the AOMs attached to a corresponding AOM stage, each AOM stage including one or more adjusters for adjusting a position of a corresponding AOM, the adjuster(s) on a side of the AOM stage opposite the AOM stage base); the at least one AOM includes two AOMs and the one or more recesses, the one or more pedestals, the first plurality of threaded holes, the plurality of guide pins, and the second plurality of holes permit the convertible optical system to form at least a single pass/double pass optical system and a double pass/single pass optical system; each of the at least one AOMs receiving at least one of a fixed frequency radio frequency drive signal, a variable frequency radio frequency drive signal, a fixed power radio frequency drive signal, or a variable power radio frequency drive signal; and the convertible optical system comprises at least one coaxial cable connector (each coaxial cable connector for receiving a corresponding radio frequency drive signal and for providing the corresponding radio frequency drive signal to a corresponding AOM).

In yet other embodiments, the convertible optical system comprises at least one spatial filter for spatially filtering light and at least one spatial filter stage having corresponding spatial filter stage bases (each of the spatial filters attached to a corresponding spatial filter stage, each spatial filter stage including one or more adjusters for adjusting at least one of a position or a degree of spatial filtering of a corresponding spatial filter, the adjuster(s) on a side of the spatial filter stage opposite the spatial filter stage base); each spatial filter including one of an iris-type adjustable pinhole, a fixed pinhole, an optical slit-type aperture, or an optical fiber; and the convertible optical system comprises at least one lens for focusing or reimaging light and at least one lens stage having corresponding lens stage bases (each of the lenses attached to a corresponding lens stage).

In still other embodiments, the convertible optical system comprises an optical wedge for deriving an optical signal (the derived optical signal for mitigating amplitude and/or frequency noise of the light) and an optical wedge stage having a corresponding optical wedge base (the optical wedge attached to the optical wedge stage, the optical wedge stage including one or more adjusters for adjusting a position of the optical wedge, the adjuster(s) on a side of the optical wedge stage opposite the optical wedge stage base); and the convertible optical system comprises a polarizing beam-splitter, the polarizing beam-splitter for reflecting light having a first polarization and for transmitting light having a second polarization and a polarizing beam-splitter stage (the polarizing beam-splitter attached to the polarizing beam-splitter stage).

In further embodiments, the convertible optical system comprises polarization compensating optics for selectively coupling a specific polarization of light to a polarization-maintaining optical fiber and a polarization compensating optics stage (the polarization compensating optics attached to the polarization compensating optics stage); the convertible optical system comprises at least one half-wave plate, each half-wave plate for rotating a polarization of the light and a half-wave plate stage (each half-wave plate attached to a corresponding half-wave plate stage); and the convertible optical system comprises a quarter-wave plate adapted to rotate a polarization of the light and a quarter-wave plate stage (the quarter-wave plate attached to the quarter-wave plate stage).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
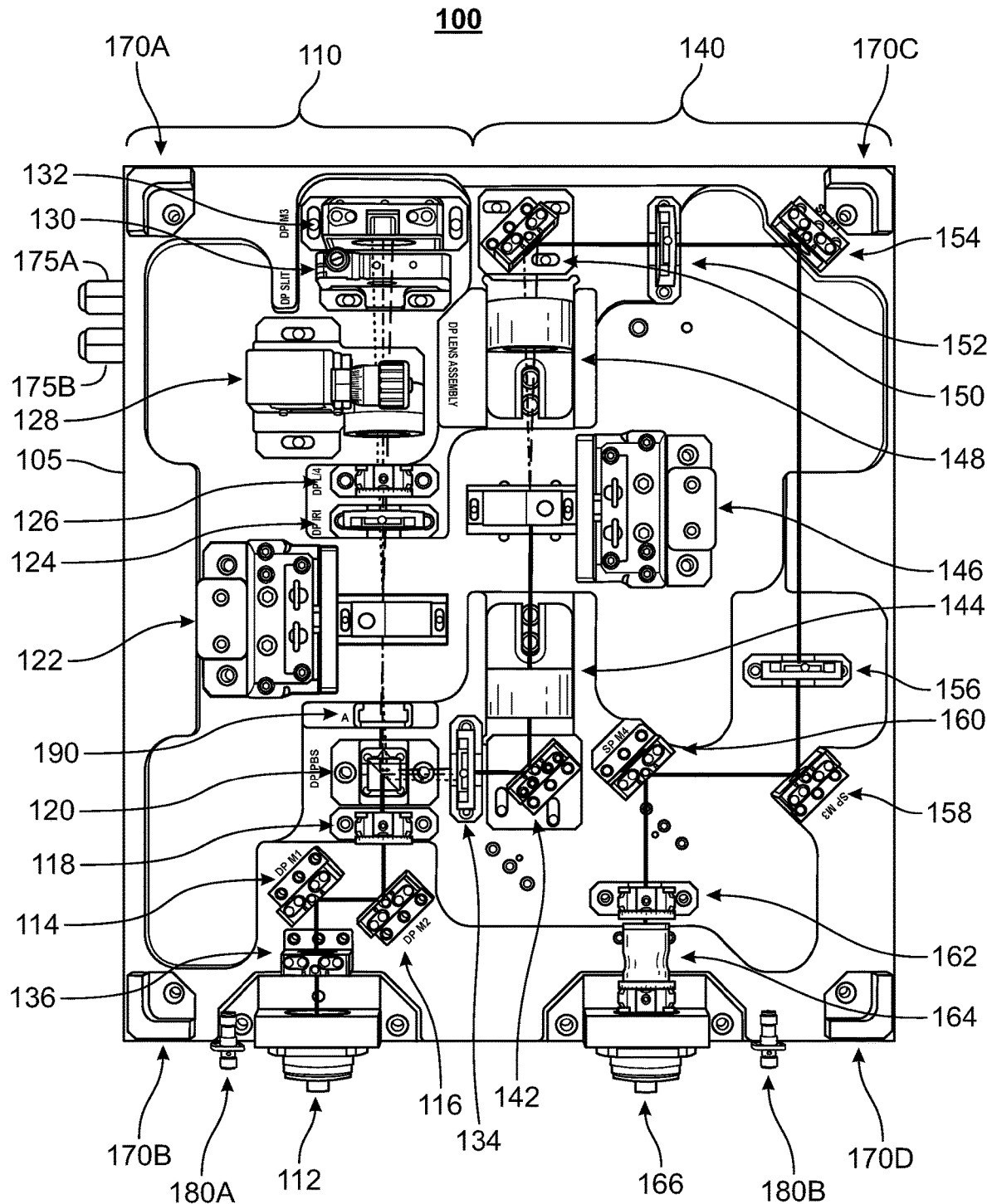
FIG. 1 illustrates a convertible optical system having a double pass/single pass configuration in accordance with one or more embodiments of the present invention.

FIG. 1 illustrates a convertible optical system 100 having a double pass (DP)/single pass (SP) configuration, with corresponding DP and SP stages 110, 140. The convertible optical system 100 includes a baseplate 105, which allows conversion of the optical configuration, as discussed below with reference to FIG. 4. Incoming light, for example, a laser beam, enters the DP stage 110 of the convertible optical system 100 through an optical port 112 via an input optical fiber (not illustrated). A pair of mirrors 114, 116 reflect the light, which then passes through a half-wave ($\lambda/2$) plate 118 that rotates the light into the p-polarization. A polarizing beam-splitter cube 120 then passes the light with this polarization. The light then passes through a DP acousto-optic modulator (AOM) 122 that diffracts the light into multiple orders of frequency-shifted light. The frequency of the multiple orders of light is given by $f_m = f_0 + mF_{RF2}$, where $f_0$ is the original optical frequency of the light, m is the order of the optical mode (first in this case), and $F_{RF2}$ is the RF frequency that drives the DP AOM 122. The diffraction angle of the DP AOM 122 depends on the RF frequency driving the DP AOM 122 and is generally small. The diffracted orders of the light from the DP AOM 122 propagate together through (or are blocked by) a spatial filter in the form of an iris-type adjustable pinhole 124, a quarter-wave ($\lambda/4$) plate 126 that circularly polarizes the diffracted orders of light, and a short focus lens 128 that focuses the desired order through a spatial filter in the form of an optical slit-type aperture 130 onto a retro-reflective mirror 132. By focusing the light onto the retro-reflective mirror 132 through the optical slit-type aperture 130, the optical slit-type aperture 130 spatially filters out the undesired modes of light, leaving the desired first-order mode with a frequency given by $f_{DP,1} = f_0 + F_{RF2}$. The retro-reflective mirror 132 is a relatively large plane parallel mirror so that the convertible optical system 100 may handle operating wavelengths from the infrared (IR) to the ultraviolet (UV). The retro-reflective mirror 132 also preferably has a long, for example, one inch, translation length in the direction of the light to improve alignment.

The first order mode then reflects back along the same path that it originally travels where the $\lambda/4$ plate 126 transforms the light from circularly polarized light to linear s-polarized light and again passes through the DP AOM 122. The DP AOM 122 again diffracts the light, causing an additional shift in the frequency. The polarizing beam-splitter cube 120 now reflects the multiple diffracted modes because of their s-polarization. Because of the two passes through the DP AOM 122, the change in the frequency of the light doubles such that $f_{DP,total}=f_0+2 F_{RF2}$. The desired first order mode of the light then passes through an iris-type adjustable pinhole 134 and passes into the SP stage 140.

The DP stage 110 may optionally include an optical wedge 136, located between the optical input port 112 and the mirror 114. One can use the optical wedge 136 to derive an optical signal used to feedback and mitigate amplitude and frequency noise imposed by the input fiber on the light.

The light from the DP stage 110 enters the SP stage 140 where a mirror 142 reflects the light. A lens 144 then focuses the light through a SP AOM 146. Again, selecting the first order diffracted mode, the frequency of the light is now $f_{SP,1}=f_{DP,total}+F_{RF1}$, and $F_{RF1}$ is the RF frequency that drives the SP AOM 146. A lens 148 reimages the frequency shifted light on the opposite side of the SP AOM 146 and a mirror 150 then reflects the light. The light then passes through a spatial filter in the form of an iris-type adjustable pinhole 152, reflects off a mirror 154, and passes through another spatial filter in the form of an iris-type adjustable pinhole 156. As will be appreciated by one of skill in the art, the iris-type adjustable pinhole spatial filters 124, 134, 152, 156 also assist when initially aligning the various convertible optical systems 100, 200, 300, 500, 600. Providing the lenses 144, 148 with long, for example, half an inch, translation lengths in the direction of the light likewise assists in aligning the various convertible optical systems 100, 200, 300, 500, 600. The light then reflects off a pair of mirrors 158, 160, and then passes through a λ/2 plate 162, and finally through polarization compensating optics 164. The λ/2 plate 162 and the polarization compensating optics 164, which include polarizing beam-splitter cubes, allow one to selectively couple a specific polarization of light to a polarization-maintaining optical fiber (not illustrated) attached to an optical port 166. For certain embodiments, the SP stage 140 primarily increases the extinction ratio of the light, particularly when the light couples into a fiber. As will be described below, the SP stage 140 implements switch or attenuation functions in other embodiments. In yet other embodiments, the SP stage 140 implements even greater frequency shifts via the SP AOM 146.

The above discussion assumes use of the positive first order (+1) mode, resulting in an increase in the operating frequency. Other circumstances may require a decrease in the operating frequency. This merely requires employing the negative first order (−1) mode. By using the −1 modes for both the DP AOM 122 and the SP AOM 146, the output operating frequency from the DP stage 110 becomes $f_{DP,total}=f_0-2 F_{RF2}$, while the output operating frequency from the SP stage 140 becomes $f_{SP,1}=f_{DP,total}-F_{RF1}$. As will be appreciated by one of skill in the art, one may also use the +1 mode for the DP stage 110 and the −1 mode for the SP stage 140 or the −1 mode for the DP stage 110 and the +1 mode for the SP stage 140.

The convertible optical system 100 demonstrated an optical efficiency as high as 17% at UV wavelengths, measured as the output power coupled into an output fiber divided by the input power emerging from the input fiber. This is a significant improvement over prior art DP/SP systems implemented on an optical bench. The optical efficiency should be even higher at longer operating wavelengths.

The baseplate 105 includes four cover mounts 170A-170D that permit placing a cover (not illustrated) over the optical elements, though other embodiments may have a different number of cover mounts. This cover prevents dust, etc., from collecting on the optical elements. The cover also serves as a thermal barrier and to limit air currents, such that the optical elements stay at a more constant temperature, thereby avoiding, or at least reducing, thermally induced misalignment of the optical elements, i.e., pointing instability. The cover also provides an eye-safe environment by blocking any stray reflections. The baseplate 105 further includes input and output ports 175A, 175B, for allowing a purge gas, for example, nitrogen ($N_2$) or dry air, to purge the convertible optical system 100, thereby again ensuring that dust does not collect on the optical elements. As will be appreciated by one of skill in the art, these features are especially critical when operating at UV wavelengths, where the light is more likely to ionize dust and cause it to collect on optical elements, which may then "burn" and degrade as the surface dust absorbs high amounts of optical power from the light. Lastly, the baseplate 105 includes a pair of sub-miniature coaxial cable connectors (SMAs) 180A, 180B, that receive the corresponding radio frequency (RF) signals required to drive the SP AOM 146 and DP AOM 122, respectively.

The optical system 100 illustrated in FIG. 1 includes an optional optical power measurement bracket 190. The optical power measurement bracket 190 can hold the head of an optical power meter (not illustrated) permitting measurement of the light power at this point in the optical path of the optical system 100. Other embodiments include one or more additional optional optical power measurement brackets 190 located at other desired points in the optical path of the optical system 100. These various optical power measurement points allow one to monitor performance degradation of the various optical elements in the optical system 100.

The layout of the optical system 100 was experimentally demonstrated and shown to work very well in operation for longer wavelengths, for example, 780 nm, where the AOM diffraction angles available were larger (approximately 0.028 rad) than those available for shorter wavelengths, for example, 400 nm (approximately 0.014 rad).

Figure 2:
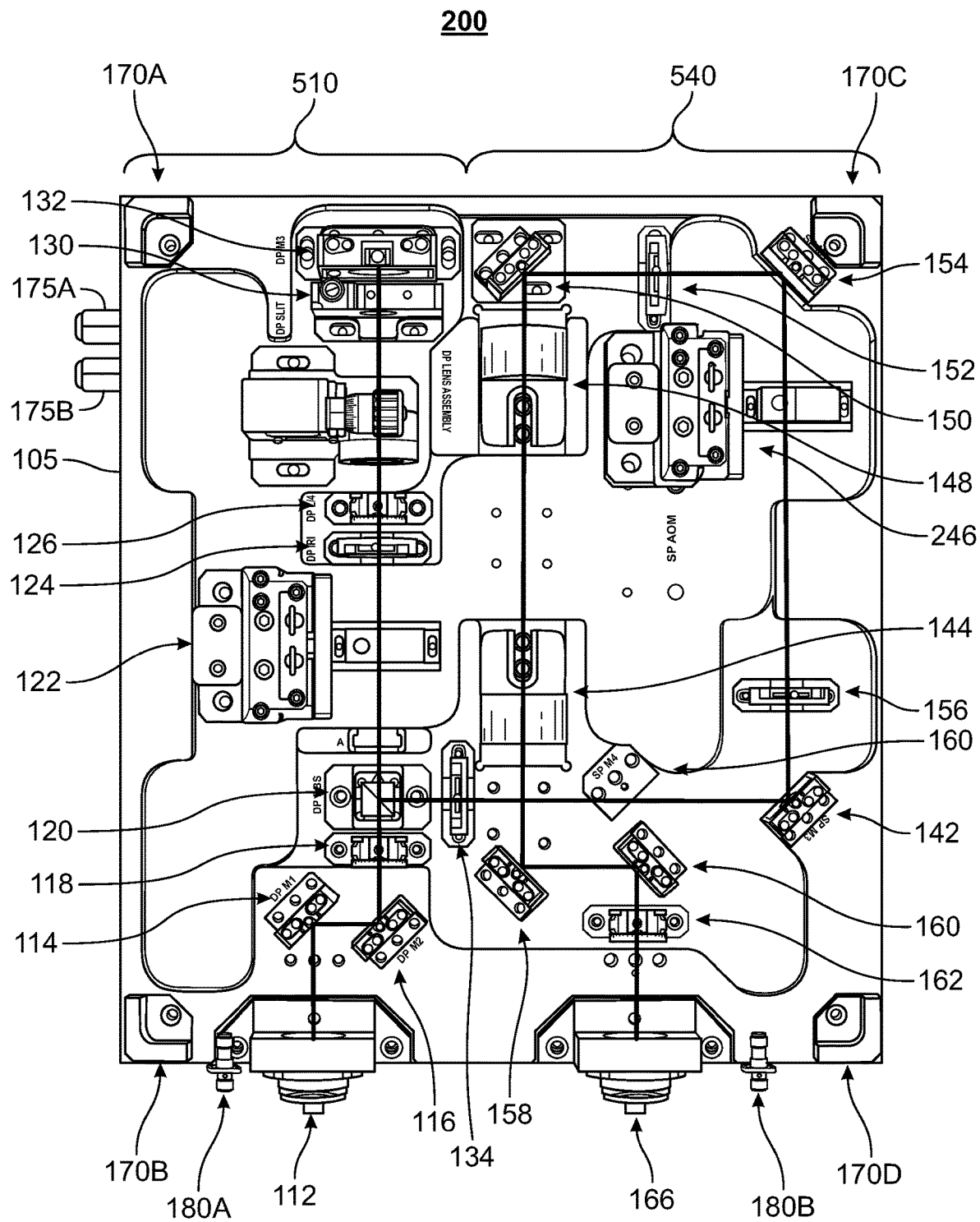
FIG. 2 illustrates a convertible optical system having an alternative double pass/single pass configuration in accordance with one or more embodiments of the present invention.

FIG. 2 illustrates a convertible optical system 200 having an alternative DP/SP configuration, but employing the same baseplate 105 and virtually all of the same optical elements as the convertible optical system 100 illustrated in FIG. 1. The DP stage 110 in both convertible optical systems 100, 200 is identical. The SP stage 240 in the convertible optical system 200 locates the SP AOM 246 farther from the polarizing beam-splitter cube 120. This additional length provides greater separation of the optical modes, which permits more effective spatial filtering of the light. This greater separation is most beneficial with shorter operating wavelengths, for example in the UV, where the diffraction angles are smaller. While not illustrated in FIG. 2, the convertible optical system 200 may, like the convertible optical system 100 illustrated in FIG. 1, optionally include polarization compensating optics 162 as part of the SP stage 140 and an optical wedge 136 as part of the DP stage 110.

Figure 3:
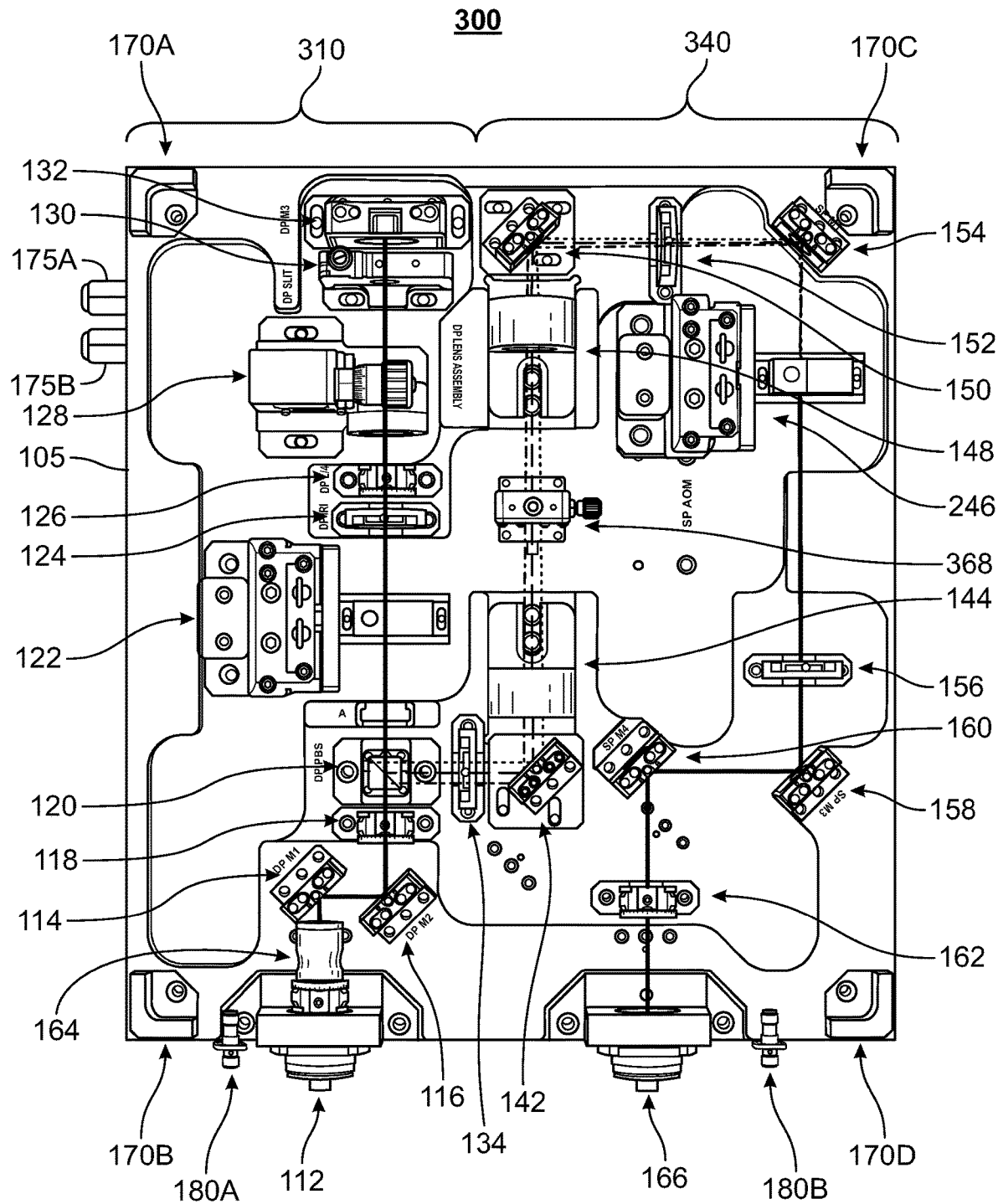
FIG. 3 illustrates a convertible optical system having a single pass/double pass configuration in accordance with one or more embodiments of the present invention.

FIG. 3 Illustrates a convertible optical system 300 having an SP/DP configuration, but employing the same baseplate 105 and virtually all of the same optical elements as the convertible optical systems 100, 200 illustrated in FIGS. 1 and 2. The convertible optical system 300 is most similar to the convertible optical system 200 with the light circulating in the opposite direction, i.e., in through the SP stage 340 and out through the DP stage 310. Other differences include the placement of a spatial filter in the form of a fixed pinhole 368 between the pair of lenses 144, 148. The fixed pinhole 364 may have a much smaller opening than the iris-type adjustable pinholes used elsewhere in the convertible optical system 300. The fixed pinhole 368 has a much smaller opening as the light passes through the SP AOM 246 only once, with the fixed pinhole 368 providing greater rejection of the undesired modes, especially at shorter operating wavelengths. The pinhole 368 is functionally similar to the single-mode optical fiber employed by the convertible optical system 700 illustrated in FIG. 7 and described below, as both serve as spatial filters. Convertible optical system 300 also differs from the DP/SP configuration convertible optical systems 100, 200 in that the polarization compensating optics 164 are part of the DP stage 310.

Which convertible optical system configuration is desired depends upon several factors. As noted above, the operating wavelength is one factor to consider when determining whether to employ the configuration of convertible optical system 100 or convertible optical system 200. Factors to consider when determining whether to employ a DP/SP configuration or an SP/DP configuration include, among other things, the operating characteristics of the DP AOM 122 and the SP AOM 146, the desired/required degree of extinction with respect to undesired modes, and whether one or more frequencies will be present at the output. Multiple RF signals with different frequencies ($f_{tone1}$, $f_{tone2}$, $f_{tone3}$, etc.) can be summed and used to drive the DP AOM 122 and/or the SP AOM 146. This produces a first order diffracted beam with a corresponding frequency shift for each of the applied tones. Applying multiple tones to the SP AOM 146 will result in a single frequency shift for each tone. However, applying multiple tones to the DP AOM 122 will give terms that are the sums and differences of the frequency shifts. This is due to the light passing through the DP AOM 122 twice, which causes further frequency shifting of each of the tones from the first pass of the light through the DP AOM 122. The relative contribution of a given tone can be adjusted by adjusting the power of the corresponding RF signal. The downstream coupling of light from the output of the SP AOM 146 when used with multiple tones may be adversely affected for a large spread of tone frequencies. This results from the wavelength corresponding to each tone exiting the SP AOM 146 with a slightly different diffraction angle. The layout of the convertible optical system 100 minimizes this effect with a symmetric pair of lenses 144, 148 before and after the SP AOM 146, which allows imaging of the interaction region in the SP AOM 146 onto the output optical port 166. The range of frequency shifts for acceptable coupling efficiency is approximately ±10-20 kHz for the SP AOM 146. The frequency shifting range of the DP AOM 122 is much larger and is typically in the range of ±10 s of MHz.

Figure 4:
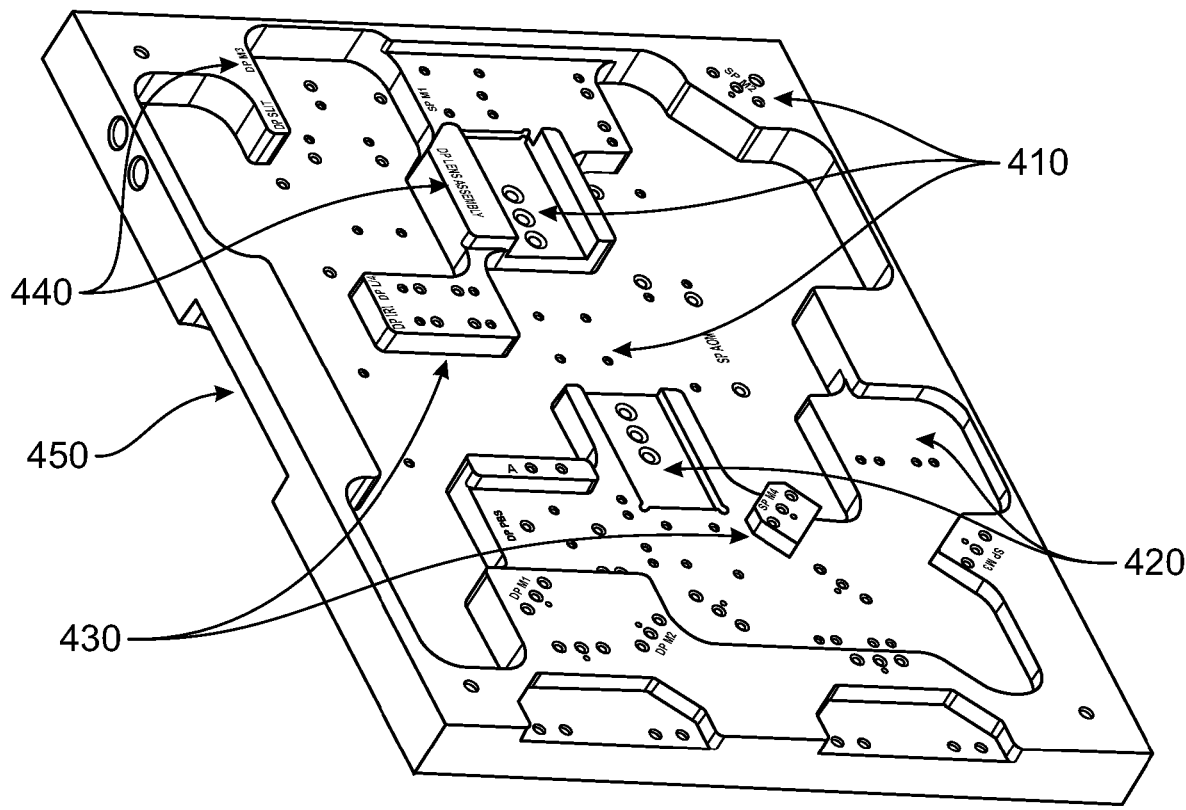
FIG. 4 illustrates a baseplate that may employed with each of the convertible optical systems in accordance with various embodiments of the present invention.

FIG. 4 illustrates the baseplate 105 by itself. As discussed above with reference to FIGS. 1-3 and below with reference to FIGS. 4 and 5, virtually the same optical elements may populate this same baseplate to generate several different configurations. Thus, the convertible optical system, including the baseplate 105 and the various optical elements, is a "convertible" optical system as multiple configurations are possible. The baseplate 105 includes a number of threaded and unthreaded holes 410. The threaded holes 410 accept the threaded mounting bolts (not illustrated) used to fasten various optical elements mounted on corresponding optical element stages to the baseplate 105. The unthreaded holes 410 accept guide pins (not illustrated) used to laterally align various optical elements mounted on corresponding optical element stages with respect to the baseplate 105. In some embodiments one end of the guide pins may threaded, in which case all of the holes will be threaded. The face of the baseplate 105 is machined to form a number of recesses 420 and pedestals 430 to locate the various optical elements at the correct height so that the light propagates in a single plane parallel to the surface of the baseplate 105. Stated differently, the recesses and pedestals have corresponding elevations such that the optical axis of each of optical elements forms a common plane. This simplifies alignment in that only horizontal angles need adjustment, as the vertical angles are fixed by having the optical axes of the optical elements form a common plane parallel to the surface of the baseplate 105. The illustrated baseplate 105 further includes a number of labels 440 to identify the location of specific optical elements.

The baseplate 105 also includes two recess 450 (though only one is illustrated) on opposite sides of the lower surface of the baseplate 105 that serve as handles for moving the convertible optical system. The baseplate 105, formed of metal, has an overall size of eighteen inches or less on each major side, and preferably twelve inches or less as metal blanks of this size may be readily and cheaply purchased. For example, the baseplate 105 illustrated in FIGS. 1-6 is 11.85 inches by 13.5 inches, while the baseplate 705 illustrated in FIG. 7 is 11.8 inches by 13.3 inches. Due to the compact nature of the convertible optical system built on such a small baseplate 105, the resultant short beam paths reduce optical pointing instabilities—a significant issue encountered when a similar optical system is built across a large optical bench.

Figure 5:
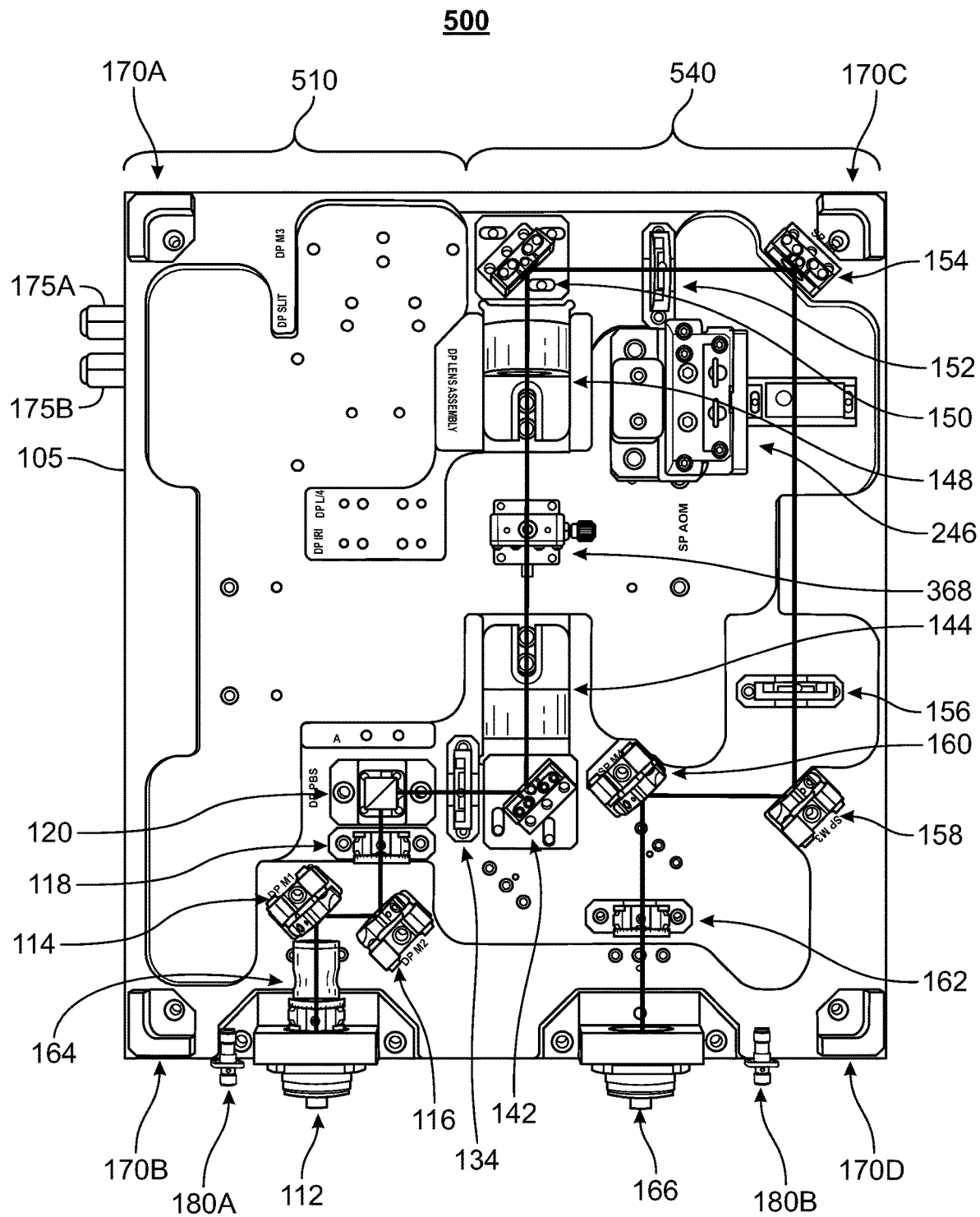
FIG. 5 illustrates a convertible optical system having a single pass configuration in accordance with one or more embodiments of the present invention.

FIG. 5 illustrates a convertible optical system 500 in accordance with one or more embodiments of the present invention that includes just a SP stage 540, though it employs the same baseplate 105 as the convertible optical systems 100, 200, 300 described above. Incoming light enters the SP stage 540, where it passes through an optional optical wedge (not illustrated), a λ/2 plate 162, reflects off a pair of mirrors 160, 158 and then passes through a spatial filter in the form of an iris-type adjustable pinhole 156. The light then passes through a SP AOM 246, which diffracts and frequency shifts the light. The light then reflects off a mirror 154, passes through a spatial filter in the form of an iris-type adjustable pinhole 152, and reflects off a mirror 150. A lens 148 focuses the light, which then passes through a spatial filter in the form of a fixed pinhole 368, and a lens 144 then reimages the light. The light then reflects off a mirror 142, passes through an iris-type adjustable pinhole 134, and then reflects off a polarizing beam-splitter 120. The light passes through a λ/2 plate 118, reflects off a pair of mirrors 116, 114, and then couples to a polarization-maintaining optical fiber (not illustrated) via polarization compensating optics 164 in the DP portion 510 of the baseplate 105.

Figure 6:
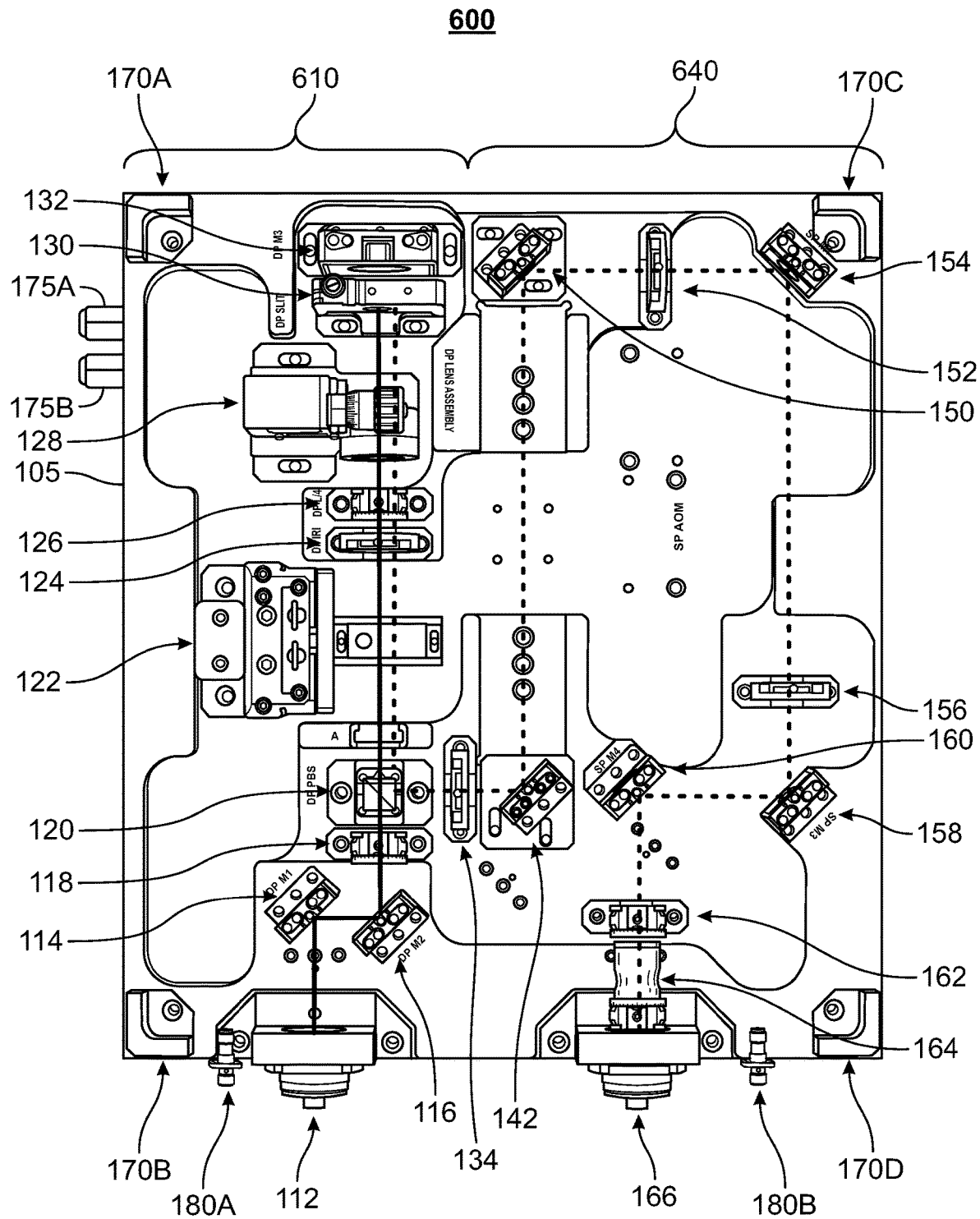
FIG. 6 illustrates a convertible optical system having a double pass configuration in accordance with one or more embodiments of the present invention.
Figure 7:
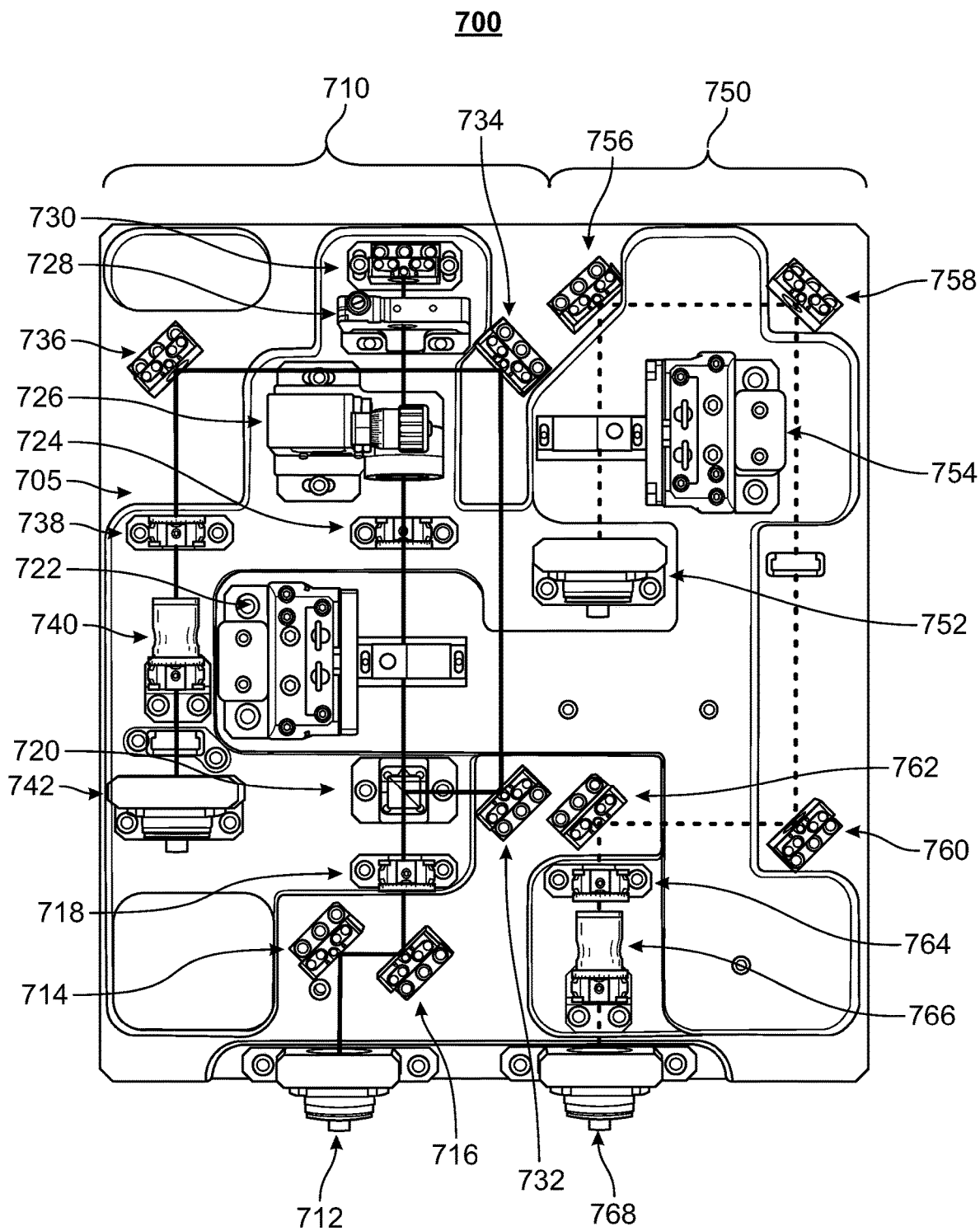
FIG. 7 illustrates a convertible optical system having an alternative double pass/single pass configuration in accordance with one or more embodiments of the present invention.

FIG. 6 illustrates a convertible optical system 600 in accordance with one or more embodiments of the present invention that includes just a DP stage 610, though it employs the same baseplate 105 as the convertible optical systems 100, 200, 300 described above. Incoming light enters the DP stage 610 of the convertible optical system 600 through an optical input port 112 via an input optical fiber (not illustrated). The light reflects off a pair of mirrors 114, 116, and then passes through a λ/2 plate 118, which rotates the light into the p-polarization. A polarizing beam-splitter cube 120 then passes the light with this polarization. The light then passes through a DP AOM 122, which diffracts and frequency shifts the light. The light passes through a spatial filter in the form of an iris-type adjustable pinhole 124, a λ/4 plate 126, and a short focus lens 128 that focuses the light through an optical slit-type aperture 130 onto a retro-reflective mirror 132. The light then reflects back along the same path that it originally traveled where the λ/4 plate 126 transforms the light from circularly polarized light to linear s-polarized light and again passes through the DP AOM 122. The DP AOM 122 again diffracts and frequency shifts the light. The light then reflects from the polarizing beam-splitter cube 120 because of its s-polarization, and passes through an iris-type adjustable pinhole 134. The light then reflects off a series of five mirrors 142, 150, 154, 158, 160 and passes through two intervening iris-type adjustable pinholes 152, 156. The light ultimately passes through a λ/2 plate 162 and couples to a polarization-maintaining optical fiber (not illustrated) via polarization compensating optics 164 in the SP portion 640 of the baseplate 105.

Because the same baseplate 105 can be used to create just a SP stage 540 or just a DP stage 610, one can incrementally build up to a DP/SP or SP/DP convertible optical system as funding permits.

FIG. 7 illustrates a convertible optical system 700 having a DP/SP configuration in accordance with one or more embodiments of the present invention that employs a single-mode optical fiber to implement spatial filtering of the modes, as opposed to the iris-type adjustable pinholes and fixed pinholes employed in the convertible optical systems 100, 200, 300 described above with reference to FIGS. 1-3. The convertible optical system 700 has a DP/SP configuration, with corresponding DP and SP stages 710, 750. The convertible optical system 700 includes a baseplate 705. Incoming light enters the DP stage 710 through an input port 712 via an input optical fiber (not illustrated). The light then reflects off a pair of mirrors 714, 716, and then passes through a λ/2 plate 718, which rotates the light into the p-polarization. A polarizing beam-splitter cube 720 then passes the light with this polarization. The light then passes through a DP AOM 722 that diffracts the light into multiple orders of frequency-shifted light, where the frequency shift depends upon the RF frequency that drives the DP AOM 722. The diffracted orders of the light from the DP AOM 722 propagate together through a λ/4 plate 724 that circularly polarizes the diffracted orders of light, and a short focus lens 726 that focuses the desired order through an optical slit-type aperture 728 onto a retro-reflective mirror 730. By focusing the light onto the retro-reflective mirror 730 through the optical slit-type aperture 728, the optical slit-type aperture 728 spatially filters out the undesired modes of the light, leaving the desired first-order mode.

The first order mode then reflects back along the same path that it originally traveled, where the λ/4 plate 724 transforms the light from circularly polarized light to linear s-polarized light and then passes it through the DP AOM 722. The DP AOM 722 again diffracts the light, causing an additional shift in the frequency. The multiple diffracted modes now reflect off the polarizing beam-splitter cube 720 because of their s-polarization. The desired first order mode of the light then reflects off a series of mirrors 732, 734, 736. The light then passes through a λ/2 plate 738 and polarization compensation optics 740 before coupling to a spatial filter in the form of a single-mode optical fiber (not illustrated) held by optical fiber mount 742.

The light passes from the DP stage 710 to the SP stage 750 via the single-mode optical fiber, where an optical fiber mount 752 holds the optical fiber. Upon exiting the optical fiber, the light passes through a SP AOM 754, which frequency shifts the light based upon the RF frequency that drives the SP AOM 754. The frequency shifted light then reflects off a series of mirrors 756, 758, 760, 762, passes through a λ/2 plate 764, and finally exits the convertible optical system 700 through polarization compensating optics 766 to a polarization-maintaining optical fiber (not illustrated) attached to an optical port 768.

While the convertible optical system 700 operates as intended, it does possess at least two drawbacks relative to the convertible optical systems 100, 200, 300 described above. First, the optical losses are higher due to coupling to and from the optical fiber as a spatial filter. Further, the optical fiber may degrade over time, especially when used at high optical powers with UV light.

The DP/SP convertible optical systems can provide some additional functionality. For example, the SP stage may function as either a switch or an attenuator. Implementing the SP stage as a switch requires aligning the optical elements in the SP stage with an RF signal applied to the SP AOM, resulting in the ON state as the light falls on the output. The SP AOM does not diffract the light when no RF signal drives the SP AOM, and thus the light does not fall on the output, resulting in the OFF state. Implementing the SP stage as an attenuator is similar to that of the switch, but instead of turning the RF signal off, one merely decreases the power of the RF signal, thereby changing the amount of light coupled into the various modes. As less light is now coupled to the output mode, the output light power decreases. In each case, the switch or attenuation functions are rapid given the very fast response time of the SP AOM. This is especially useful when one wants to modulate the light coming from a continuous wave laser. Other embodiments of the present invention implement the switch or attenuator functionality through a change in the frequency of the RF signal, which causes a change in the diffraction angle and a corresponding change in the amount of light falling on the output.

The DP/SP convertible optical systems can also provide frequency sweeping functionality. This frequency sweeping functionality allows one to sweep the frequency of the output light. The frequency sweeping functionality typically requires varying the frequency of the RF signal applied to the DP AOM when a wide range of frequencies, for example, tens of MHz, is swept. When only a narrow range of frequencies, for example, tens of kHz, is swept, either the SP AOM or the DP AOM may be employed as the change in diffraction angle is smaller.

Due to the very compact nature of the various disclosed convertible optical systems, the optical element stages to which the optical elements are mounted preferably have their one or more motion adjustment controls opposite their optical element stage bases, which mount to the baseplate. This ensures that when one aligns an optical element that one does not bump another optical element, which would be the case with more common optical element stages with motion adjustment controls on the backside of the optical elements. A further issue with the optical element stages for the DP AOM and SP AOM is the weight of the DP AOM and SP AOM. As the optical element stages employed for the AOMs are designed to be mounted horizontally, yet must be mounted vertically in the various disclosed convertible optical systems, the spring tensioners in the optical element stages are replaced with stronger spring tensioners. The mounts between the optical element stages and the DP AOM and SP AOM should be as light as possible, which may mean hollowing out the mounts.

The various disclosed convertible optical systems offer a number of benefits over traditional DP/SP, SP/DP, DP, or SP optical systems built on an optical bench. These benefits include:

(1) Fast optical alignment and component replacement due to the guide pins in the baseplate.

(2) Reduced size as the baseplate is preferably formed from a fourteen inch by twelve inch metal plate.
(3) High optical efficiency and reduced optical pointing instability due to the short beam paths when built upon a small baseplate.
(4) Simple reconfigurability as DP/SP, SP/DP, DP, and SP configurations can all be built on the same baseplate and with the same optical elements.
(5) Nitrogen or dry air purge capability with a cover which is not readily feasible when working on an optical bench.
(6) Reduced vibrational and thermal instabilities of the optical elements due to the compact size of the convertible optical system and a thermally insulating cover.
(7) The ability to sweep the frequency, modulate the amplitude, and generate multiple frequency tones on the light.
(8) Optical feedback for noise cancellation in the input optical fiber due to an optical wedge at the input to the convertible optical system.
(9) Efficient coupling of the light to a polarization maintaining optical fiber due to polarization compensating optics at the output to the convertible optical system.
(10) The convertible optical system is portable at a weight of less than forty pounds and multiple convertible optical systems can be stacked significantly increasing functionality per unit area.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A convertible optical system comprising:
a baseplate having a face, the baseplate including:
one or more recesses formed in the face of the baseplate, each of the one or more recesses adapted to locate one or more corresponding first optical element stages;
one or more pedestals formed in the face of the baseplate, each of the one or more pedestals adapted to locate one or more corresponding second optical element stages;
a first plurality of threaded holes, each of the first plurality of threaded holes adapted to receive a corresponding mounting bolt for a corresponding one of the first or second optical element stages;
a second plurality of holes, each of the second plurality of holes adapted to receive a corresponding guide pin for a corresponding one of the first or second optical element stages;
wherein a corresponding elevation of each of the one or more recesses and each of the one or more pedestals is adapted to place an optical axis of each optical element mounted to a corresponding one of the first or second optical element stages in a common plane, the common plane being parallel to the face of the baseplate; and
wherein the one or more recesses, the one or more pedestals, the first plurality of threaded holes, and the second plurality of holes are adapted to permit the convertible optical system to form at least two of a single pass optical system, a double pass optical system, a single pass/double pass optical system, or a double pass/single pass optical system.

2. The convertible optical system of claim 1, wherein the baseplate further includes one or more ports, at least one of the one or more ports adapted to receive a purge gas.

3. The convertible optical system of claim 1, wherein the baseplate further includes a pair of handle recesses on opposite sides of a lower surface of the baseplate, the lower surface of the baseplate opposite the face of the baseplate.

4. The convertible optical system of claim 1, wherein the baseplate further includes a plurality of labels, each of the plurality of labels adapted to identify a location for a corresponding one of the first or second optical element stages.

5. The convertible optical system of claim 1, wherein each major side of the baseplate has a maximum dimension of eighteen inches.

6. The convertible optical system of claim 1, wherein each major side of the baseplate has a maximum dimension of fourteen inches.

7. The convertible optical system of claim 1 further comprising:
a plurality of cover mounts, the plurality of cover mounts attached to the baseplate; and
a cover, the cover adapted to be attached to the baseplate via the plurality of cover mounts.

8. The convertible optical system of claim 1
wherein one of the first or second optical element stages includes a mirror stage having a mirror attached thereto.

9. The convertible optical system of claim 1
wherein one of the first or second optical element stages includes an acousto-optic modulator stage having an acousto-optic modulator attached thereto.

10. The convertible optical system of claim 9,
wherein the one or more recesses, the one or more pedestals, the first plurality of threaded holes, and the second plurality of holes are adapted to permit the convertible optical system to form at least a single pass/double pass optical system and a double pass/single pass optical system.

11. The convertible optical system of claim 9, wherein the acousto-optic modulator is adapted to receive at least one of a fixed frequency radio frequency drive signal, a variable frequency radio frequency drive signal, a fixed power radio frequency drive signal, or a variable power radio frequency drive signal.

12. The convertible optical system of claim 9 further comprising a coaxial cable connector, the coaxial cable connectors adapted to receive a radio frequency drive signal and to provide the radio frequency drive signal to the acousto-optic modulator.

13. The convertible optical system of claim 1
wherein one of the first or second optical element stages includes a spatial filter stage having a spatial filter attached thereto.

14. The convertible optical system of claim 13, wherein the spatial filter includes one of an iris-type adjustable pinhole, a fixed pinhole, an optical slit-type aperture, or an optical fiber.

15. The convertible optical system of claim 1
wherein one of the first or second optical element stages includes a lens stage having a lens attached thereto.

16. The convertible optical system of claim 1
wherein one of the first or second optical element stages includes an optical wedge stage having an optical wedge attached thereto.

17. The convertible optical system of claim 1 wherein one of the first or second optical element stages includes a polarizing beam-splitter stage having a polarizing beam splitter attached thereto.

18. The convertible optical system of claim 1 wherein one of the first or second optical element stages includes a polarization compensating optics stage having polarization compensating optics attached thereto.

19. The convertible optical system of claim 1 wherein one of the first or second optical element stages includes a half-wave plate stage having a half-wave plate attached thereto.

20. The convertible optical system of claim 1 wherein one of the first or second optical element stages includes a quarter-wave plate stage having a quarter-wave plate attached thereto.

\* \* \* \* \*